United States Patent [19]

Gustafsson et al.

[11] Patent Number: 5,062,214

[45] Date of Patent: Nov. 5, 1991

[54] ABSOLUTE MEASUREMENT SCALE SYSTEM

[75] Inventors: Carl-Erik Gustafsson, Eskilstuna; Bo Pettersson, Torshälla, both of Sweden

[73] Assignee: C. E. Johansson AB, Eskilstuna, Sweden

[21] Appl. No.: 512,083

[22] Filed: Apr. 12, 1990

Related U.S. Application Data

[63] Continuation of Ser. No. 197,409, filed as PCT SE87/00458 on Oct. 9, 1987, published as WO88/02848 on Apr. 21, 1988, abandoned.

[30] Foreign Application Priority Data

Oct. 13, 1986 [SE] Sweden .................. 8604337

[51] Int. Cl.$^5$ .................. G01B 11/02
[52] U.S. Cl. .................. 33/706; 33/707
[58] Field of Search .................. 33/706, 707; 250/231.13, 237 G, 231.16

[56] References Cited

U.S. PATENT DOCUMENTS

| | | | |
|---|---|---|---|
| 4,101,764 | 7/1978 | Nelle | 250/237 G |
| 4,333,009 | 6/1982 | Stevens | 250/237 G |
| 4,384,204 | 5/1983 | Tamaki et al. | 250/231 SE |
| 4,403,859 | 9/1983 | Ernst | 33/707 |
| 4,420,754 | 12/1983 | Andermo | 340/870.37 |
| 4,459,702 | 7/1984 | Medwin | 33/1 D |
| 4,519,140 | 5/1985 | Schmitt | 33/706 |
| 4,602,242 | 7/1986 | Kimura | 250/237 G |
| 4,956,553 | 9/1990 | Matsui | 250/237 G |

FOREIGN PATENT DOCUMENTS 411392 12/1979 Sweden .
426989 2/1983 Sweden .

Primary Examiner—William A. Cuchlinski, Jr.
Assistant Examiner—C. W. Fulton
Attorney, Agent, or Firm—Silverman, Cass & Singer, Ltd.

[57] ABSTRACT

An absolute measuring scale system comprising a scale which extends along a measuring length, and a measuring head which is movable relative to the scale. The system further includes a fine-measurement sensor which is intended to measure the absolute values within each of a multiple of intervals lying sequentially along the scale, and a coarse-measurement sensor intended to measure the absolute values with regard to the interval within which the fine-measurement sensor is located at that moment. The invention is characterized in that the scale (2) comprises a carrier made of a transparent and form-stable material, preferably glass, which has provided on its surface an outer coating or layer which forms an opaque pattern (3, 4). The pattern formed along the length of the scale (2) forms transparent, mutually parallel binary code tracks (12), preferably in accordance with the so-called Grey-code. The measuring head includes light-emitting and light-sensitive devices, by means of which the measuring head is arranged to sense the code tracks, the coarse-measurement sensor including the code tracks (12) and the light-emitting and light-sensing devices. The pattern (3, 4) along the length of the scale (2) forms part of the sensor which is intended to co-act with the fine-measurement sensor.

16 Claims, 3 Drawing Sheets

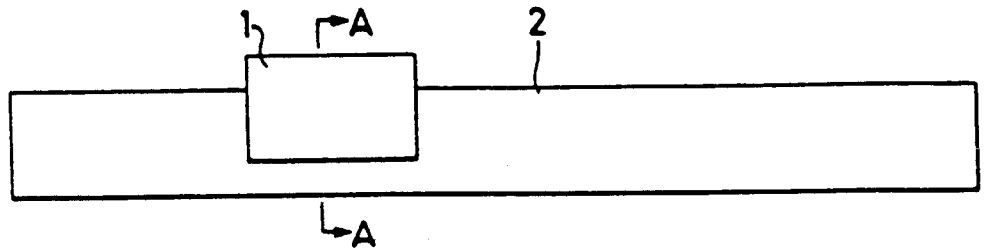
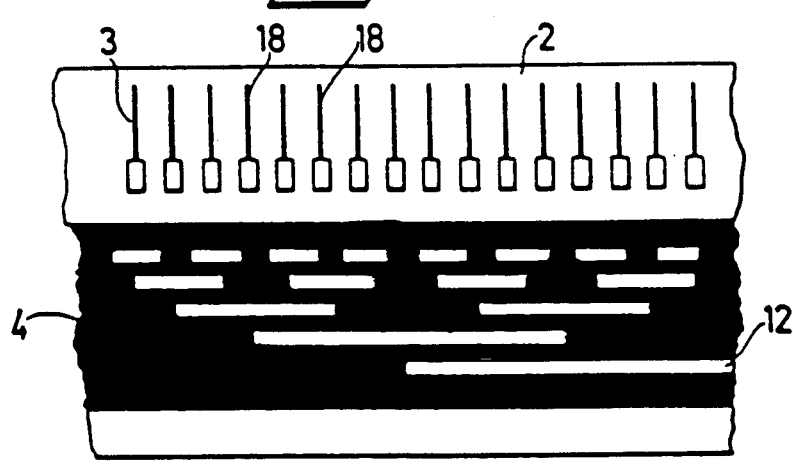
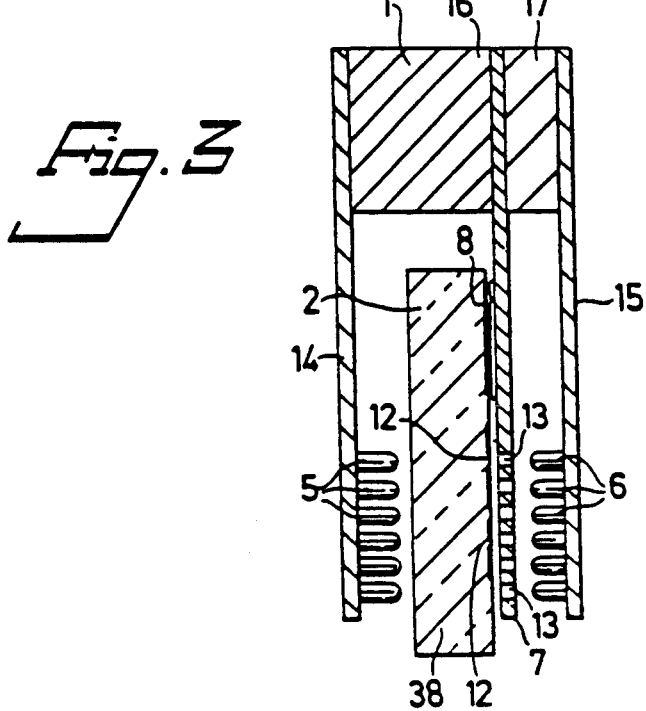

ABSOLUTE MEASUREMENT SCALE SYSTEM

This is a continuation of application Ser. No. 07/197,409 filed as PCT SE87/00458 on Oct. 9, 1987, published as WO88/02848 on Apr. 21, 1988, now abandoned.

The present invention relates to an absolute measurement scale system of the kind used in different measuring machines and measuring instruments for measuring the extent of displacement between a stationary and a movable object to a high degree of accuracy.

Such measuring systems often incorporate incremental scale systems, e.g. scale systems in which a linear scale is provided with a large number of graduation lines and with which a measuring head counts the number of graduation lines passed by the head, therewith providing information relating to the distance moved by the measuring head relative to the scale.

Incremental scale systems are encumbered with several drawbacks. One drawback is that all positional information is lost when the input measuring voltage to the system is switched off. The system must then be reset to a mechanical zero reference point and set to zero. Another drawback is that the arithmetical system is prone to interference from ambient electrical interference sources, therewith either losing pulses or gaining additional pulses. This erroneous state will then prevail until the system is reset to its mechanical zero reference. A further drawback is the likelihood of the mechanical zero reference being changed, e.g., as a result of wear, the presence of dust or dirt, and by thermal changes in the system.

It is desirable that measuring systems of the kind intended here are absolute measuring systems, i.e. with which measurements are made in conformity with a graduated straight-edge or measuring tape and with which the measurement (value) is obtained directly without counting intermediate graduations.

Such absolute measuring systems are previously known to the art from, e.g., Swedish Patent Specification No. 411 392. The measuring accuracy or resolution of measuring systems of this kind is often very high, i.e. in the order of micrometers, while such systems are capable of measuring long total linear dimensions, e.g. linear dimensions of several meters.

The Swedish Patent Specification 411 392 teaches a capacitive measuring system. Although the system affords a very high resolution, it can only effect absolute measuring operations over a limited measuring length or distance, namely a linear distance of about 10-20 mm.

Swedish Patent Specification 426 989 teaches a measuring system in which two different part-systems co-act with one another, namely a system in which one of said part-systems is constructed to measure solely within a minor interval and the other part-system is constructed for absolute measurements with regard to the number of such intervals entailed.

The measuring system taught by this latter patent specification, however, is encumbered with several drawbacks. For example, both part-systems operate electrically, i.e. the measuring signal is composed of signals that are transmitted electrically between a scale and a slide. As beforementioned, the systems are therefor prone to electrical interference from ambient sources, such as to obtain an erroneous measurement value in both one and the other of said systems. It is particularly disadvantageous when the absolute measuring part of the measuring system is subjected to ambient electrical disturbances such as to indicate a wrong value. According to Swedish Patent Specification 426 989, the absolute measuring system utilizes a capacitive measuring method, in accordance with which sensor plates are arranged on a measuring slide and electrodes on the scale. Experiences within this particular technical field, however, have shown that such sensor plates must have a particular size, in order to provide values of the coupling capacitance between scale and slide which can be used in practice. This necessitates a wide or broad scale, which consequently requires a commensurate amount of space. A further drawback with a capacitive, absolute measuring scale is that despite having a significant size, e.g. a width of 50 mm, the slide must be placed very close to the scale, e.g. at a distance of only a fraction of a millimeter therefrom. This increases the requirements of smoothness (flatness) and parallelism when manufacturing the components of the scale system and when setting-up or adjusting the system. A further drawback with a capacitive absolute measuring system is that the system is sensitive to current capacitances in the electronic system, which places particular demands on the construction of the system.

When longer linear dimensions are to be measured, e.g. length dimensions of several meters, the measuring system according to Swedish Patent Specification 426 989 is encumbered with the further drawback that the scale is made of metal. When the scale has a length of, e.g. two meters, the scale will contract or expand by some tens of micrometers with only some few degrees change in the scale temperature.

The aforementioned drawbacks are substantially alleviated by means of the present invention, which provides an absolute measuring system having high resolution.

The present invention thus relates to an absolute measuring scale system which includes a scale which extends along a measuring length and a measuring head which is movable relative to the scale; a fine-measurement sensor which is operative in measuring the absolute values within each of a number of intervals located sequentially along the scale, and a coarse-measurement sensor which is operative in measuring the absolute values relating to the interval in which the fine-measurement sensor is located at that moment in time, and which system is characterized in that the scale includes a carrier which is made of a transparent and form-stable material, preferably glass, having provided on the surface thereof a coating which forms an opaque pattern; in that said pattern forms along the length of the scale transparent, mutually parallel binary code tracks, preferably in accordance with the so-called Grey code; in that the measuring head incorporates light-emitting and light-sensitive devices by means of which the measuring head is intended to sense the code tracks, wherewith the coarse-treatment sensor includes the code tracks and the light-emitting and light-sensitive devices; and in that said pattern forms along the length of said scale sensors which are intended to co-act with the fine-measurement sensor.

The invention will now be described in more detail with reference to exemplifying embodiments thereof and with reference to the accompanying drawings, in which FIG. 1 illustrates schematically a scale and a measuring head;

FIG. 2 is an enlarged sectional view of the scale according to a first embodiment of the invention:

FIG. 3 is a sectional view taken in the line A—A in FIG. 1 according to said first embodiment of the invention;

Figure 4:
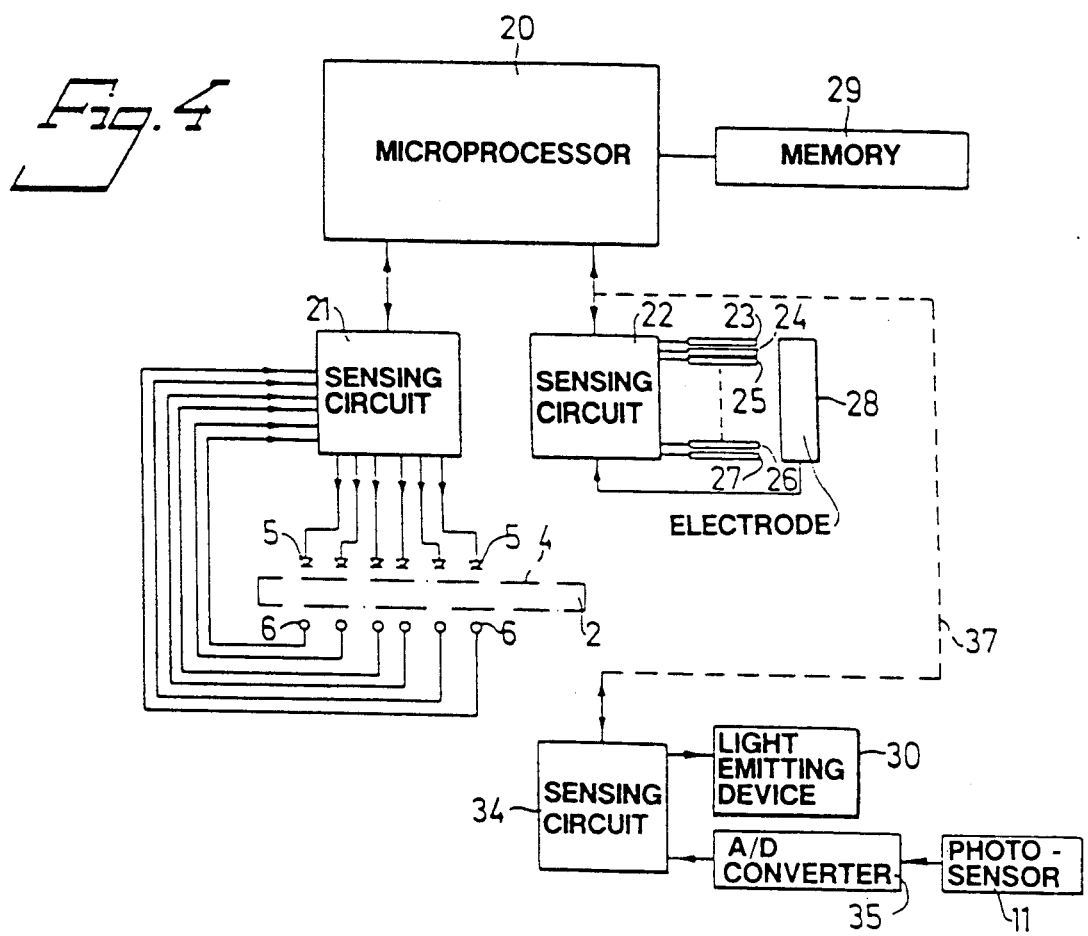
FIG. 4 is a schematic block diagram.
Figure 5:
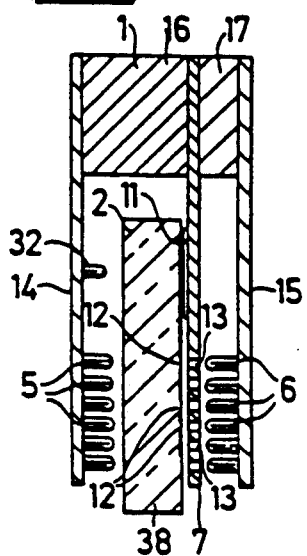
FIG. 5 is a cross-sectional view taken on the line A—A in FIG. 1 and illustrates a second embodiment of the invention.

FIG. 1 illustrates highly schematically an absolute measuring scale system which includes a scale 2 that extends along a measuring length, and a measuring head 1 which is movable relative to the scale 2. The measuring head incorporates a fine-measurement sensor which is operative in measuring the absolute values within each of a plurality of intervals located sequentially along the scale. The head 1 also incorporates a coarse-measurement sensor which is operative in measuring the absolute values relating to the interval in which the fine-measurement sensor is located at that moment in time.

FIG. 2 is an enlarged schematic view of the scale 3, 4. The scale 2 includes a carrier 38 which is made of a transparent and form-stable material. By form stable is meant that it will retain its original form over long periods of time and that it has a lower coefficient of linear and superficial thermal expansion. A preferred material is glass, which in addition to having the aforesaid properties can also be provided in long lengths of extreme smoothness and linearity.

The outer surface of the scale 2 has applied thereto a coating which forms an opaque pattern 3, 4; 3', 4' along the length of the scale 2, this pattern forming a part of the sensor for sensing the scale. The pattern incorporates two different parts 3, 4, in which a first part 3; 3' is intended to co-act with the fine-measurement sensor to provide fine measurements, and in which a second part 4; 4' is intended to co-act with the coarse-measurement sensor to provide coarse measurements.

The part 4, 4' of the scale or pattern 3, 4 forms transparent, mutually parallel code tracks 12, preferably in accordance with a so-called Grey-code. FIG. 2 illustrates only a longitudinal section of the scale. Furthermore, only five code tracks 12 are shown. The number of code tracks 12 provided is contingent on the total measuring length along the scale and the resolution desired, i.e. the longitudinal extension or length of a smallest interval capable of being measured directly by means of the code tracks of the Grey-code.

FIG. 3 is a sectional view taken on the line A—A in FIG. 1. It will be seen from FIG. 3 that the measuring head 1 partially embraces the scale. The measuring head 1 includes light-emitting devices, preferably light-emitting diodes, and light-sensitive devices 6, preferably photo-transistors. The devices are placed on mutually opposite sides of the scale and are located so that each pair of light-emitting and light-sensitive devices lies centrally above and centrally beneath a code track to be sensed by respective pairs. The arrangement also preferably includes a light screening baffle or screen 7 provided with perforations 13, which screens the light in a manner such that only light which arrives from a particular respective code track 12 is registered. With the aid of these devices the coarse-measurement sensor is intended to sense the code tracks so as to provide an absolute measurement of the location of the measuring head in relation to the scale within an interval given by the number and configuration of the code tracks of the Grey-code. The number of pairs of devices is equally as large as the number of code tracks, since each pair of devices is assigned to a single code track 12. In other respects the measuring head comprises a housing which includes two walls 14, 15 and a wall-connecting part 16, 17. The measuring head is made of a durable material, suitably metal. The light-emitting and light-sensitive devices are conveniently mounted on the walls 14, 15.

The aforementioned other part 3; 3' of the scale is intended to co-operate with the fine-measurement sensor, which is intended to determine the position of the measuring head relative to the scale within said interval, in a manner hereinafter described.

According to one preferred embodiment, the patterned surface layer is formed by first applying a covering layer of uniform thickness, and then removing parts of the layer with the aid of a photolithographic etching process or by some other corresponding etching process.

According to another preferred embodiment of the invention, the surface layer or coating comprises chromium and has a thickness of, e.g., 0.1–0.2 micrometers.

Alternatively, in the case of cheaper and less demanding applications, the scale may be made a light-permeable circuit-card laminate, e.g. a fibre-glass epoxy laminate, instead of glass. This will enable the surface layer or coating to comprise copper foil, as is conventional with circuit, cards.

Manufacture can be effected easily and reliably in both cases with regard to the various parts of the patterns and their mutual positions, i.e. irrespective of whether the carrier is made of glass or a fibre-glass/epoxy.

The aforementioned Grey scale is a binary scale. This scale can readily be given a total measuring range which is larger in the present application.

A suitable maximum absolute measuring range for the fine-measurement sensor is, e.g. 2.048 mm. Preferably the coarse-measurement sensor with associated code tracks is assigned a division which is a multiple of half the longest significant measurement length assigned to the fine-measurement sensor with associated sensor parts. Thus, in this case the coarse-measurement scale will have a division of 1.024 mm. That is if the aforesaid interval is 1.024 mm. Consequently, the least significant bit of the coarse-measurement sensor and the most significant bit of the fine-measurement sensor will overlap one another. This is utilized in a logical circuit of the kind which comprises a microprocessor 20 for comparing the values of the two sensors and for making requisite corrections in the interval boundary lines or change-over points in the least significant bit of the coarse measurement sensor with a starting point from the value according to the most significant bit of the fine-measurement sensor.

Assume, for instance, that each measuring interval is 1 mm and the fine scale works within a measuring length of 0 to 1.999 mm. If, for instance, the coarse scale is located precisely at a juncture or interval boundary between the intervals 3 and 4 mm and the coarse scale senses the interval 3 mm whereas the fine-measurement sensor indicates 1.99 mm, the distance concerned is thus 3.99 mm and not 4.99 mm. In this embodiment, the change-over points of the coarse scale are not a critical part for ensuring that a correct absolute value is always obtained.

With measuring ranges given by way of example in the aforegoing, it is possible with 16 code tracks, which gives $2^{16}$ bits of 1.024 mm, to provide a scale that has a length slightly greater than 67 meters. Despite this long distance, the width of the binary coded scale in this case is not greater than about 18 mm, since the distance between adjacent code tracks is 1 mm. It is preferred, however, to work with about 11 code tracks, since this number gives a measuring length of about 2 meters.

Thus, the use of an optical binary code scale enables, to advantage, the measuring head to be given small dimensions and the scale to be made narrow, as opposed to the case in the above discussed Swedish Patent Specification 426 989.

FIG. 4 is a schematic block diagram in which the reference 20 identifies an arithmetical circuit, which is preferably comprised of a microprocessor. Furthermore, there is provided a sensing circuit 21 which is intended to ignite the various light-emitting devices 5 sequentially, so as to avoid optical interference between the different optical channels.

The light-sensitive devices 6 are also connected to the sensing circuit 21. The sensing circuit is controlled by the microprocessor insofar as the microprocessor instructs the sensing circuit to ignite the light-emitting devices 5. The sensing circuit is constructed to send a signal to the processor 20 when the sensing circuit receives or does not receive a signal from the light-sensitive devices 6, when the pertinent light-emitting device is fired. Subsequent to passing through a complete cycle, such that all code tracks have been sensed or scanned, the microprocessor will thus contain binary information concerning the absolute position of the measuring head in relation to the scale 2.

According to a first embodiment of the invention, the fine-measurement sensor, with regard to the first part of the pattern, includes parts of a sensor in the form of electrodes 18 formed by the outer layer on the carrier. The electrodes are arranged to form, in conjunction with electrodes present in the measuring head, a known capacitive system forming the fine-measuring sensor.

One such sensor is found accurately described in Swedish Patent Specification 411 392. In brief, the capacitive measuring method described in Swedish Patent Specification 411 392 is as follows: There is provided a sensing circuit 22 which contains a signal generator for generating, e.g., eight signals which although identical are mutually displaced in phase, the phase being displaced ⅛th of a period between mutually adjacent signals. These signals are fed in a cyclic pattern to eight electrodes 23-27 in the measuring head. Only five electrodes 23-27 are shown in FIG. 4. These electrodes 23-27 are located above the narrow part of the electrodes 18 on the scale 2.

The electrodes 18 on the scale 2 are mutually identical and are arranged equidistant along the whole length of the scale.

Arranged in the measuring housing at a location above the thicker part of the last mentioned electrodes 18 is a sensing electrode 28 which is connected to the sensing circuit 22, so that a closed capacitive current path is formed. By comparing the phase position of the signal received by the sensing electrode in relation to a reference phase, information is obtained concerning the position of the electrode 28, and therewith also the position of the measuring head relative to the scale electrodes 18, within a limited interval which according to the aforegoing may be 2.048 mm. The electrodes 23-27 are formed on a circuit card or the like referenced 8 in FIG. 3.

The method described in Swedish Patent Specification 411 392 affords the particular advantage of a very high measuring resolution, namely a resolution of 0.5 micrometers, despite the fact that the distance between the electrodes 18 is of the order of millimeters.

The sensing circuit 22 is constructed to perform a measuring operation upon receipt of an instruction from the microprocessor 20, and to produce a signal which corresponds to the position of the measuring head relative to the scale within said interval. The microprocessor 20 is arranged thereafter to evaluate the signal from the coarse-measurement sensor assigned to first mentioned sensing circuit 21 and the signal from the last mentioned sensing circuit 22, so as to obtain a value which corresponds to the absolute position of the measuring head relative to the scale to a degree of accuracy of, e.g., 0.5 micrometers.

The microprocessor is also constructed or programmed to feed this measurement value to a memory 29, a display or some other means.

Thus, the aforedescribed combination of an optical scale with a capacitive scale provides a high degree of accuracy while, at the same time, enabling the measuring head to be given relatively small dimensions and the scale to be made relatively narrow in comparison with the head dimensions and scale widths of the known apparatus.

Furthermore, the distance between scale and the optical sensor is not critical, and can be made relatively large. These advantages result in reduced demands on the precision with which the measuring head is guided.

Furthermore, the influence of electrical interference etc. is eliminated with respect to the coarse-measurement sensor. In addition, the use of a scale which comprises a coated glass carrier or a carrier made of some corresponding material enables highly accurate scales to be obtained which will not be affected by changes in temperature to any appreciable extent.

In brief, the present invention enables manufacturing costs to be reduced and reliability to be increased in comparison with known systems.

In accordance with a second embodiment of the invention, illustrated in FIGS. 5–9, the fine-measurement sensor, with regard to the said part 3' of the pattern includes parts of a sensor in the form of light-permeable openings formed in the surface layer linearly along the length of the scale 2.

Figure 6:
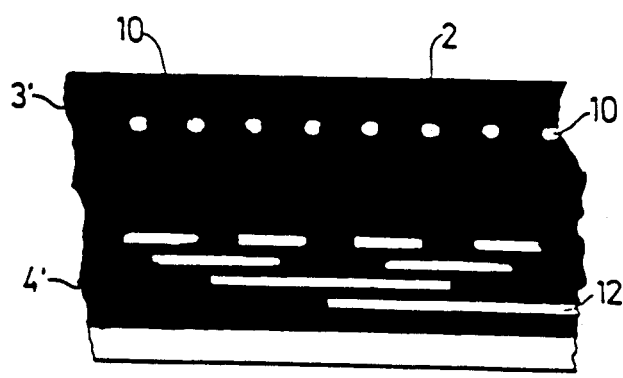
FIG. 6 is an enlarged view of the scale according to the second embodiment of the invention.

This second embodiment of the invention incorporates on one side of the scale a light-emitting device, generally referenced 30, which is intended to transmit light through said openings. Located on the other side of the scale 2 is a light-sensitive device in the form of a position-sensitive photo-sensor 11, which has an extention in the longitudinal direction of the scale which exceeds the distance between two mutually adjacent openings. The position-sensitive photo-sensor 11 is of a known kind and is intended to produce a voltage which is proportional to the position of the centre-of-mass of the light spot on the photo-sensor. The light spot is formed by transmission of light from the light-sensitive device through one of the openings. In the case of this second embodiment, however, the coarse-measurement sensor has the same construction and method of operation as that described above, i.e. an optical binary coarse-measurement sensor in which code tracks 12 are used. Only four code tracks are shown in FIG. 6 however.

Thus, in this second embodiment of the invention, the capacitive measuring arrangement has been replaced with an optical arrangement. Instead of the on electrodes 18 on the scale 2 there are used light-permeable openings 10. These are preferably spaced at equal distances apart with high precision with regard to the mutual positioning of the openings and their positions relative to the code tracks. The light permeable openings preferably have a circular shape. Thus, the outer layer or coating of this embodiment may comprise an electrically non-conductive material.

Figure 7:
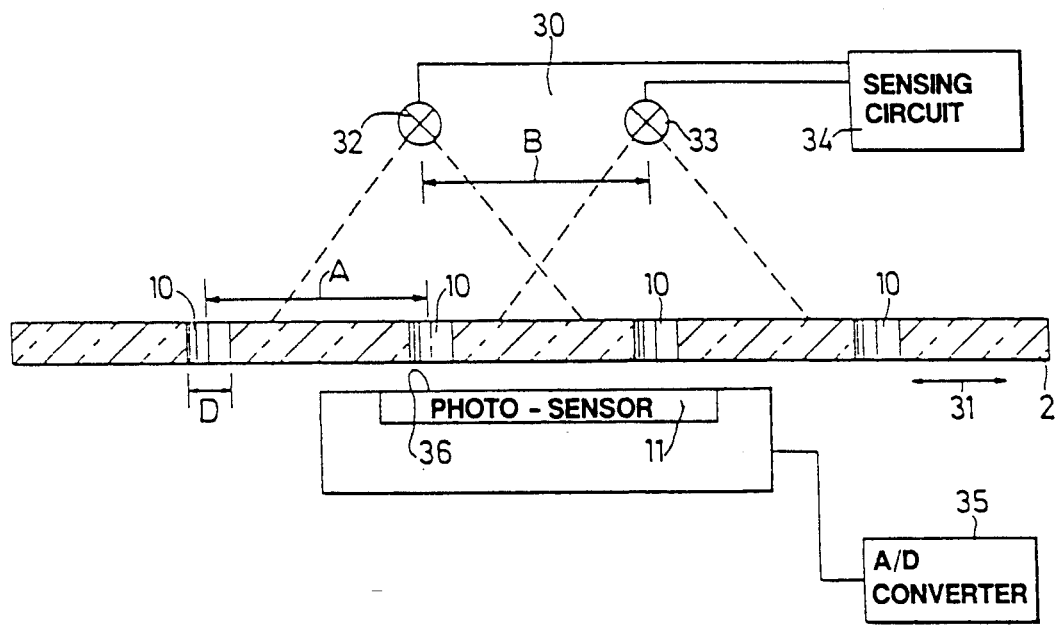
FIG. 7 illustrates the manner in which the measuring system according to the second embodiment operates.

FIG. 7 is a schematic cross-sectional view of the scale 2 and illustrates, the positioning of light emitting devices 30 and the photo-sensor 11 on respective sides of the scale. For the sake of clarity, the light-permeable openings 10 have been shown as cylindrical holes throughout the entire scale, even though the openings 10 are only formed in the outer layer or coating. The distance between two mutually adjacent openings is referenced A and the diameter of the openings is referenced D. In order to ensure that at least one full opening 10 is constantly located within the light-sensitive range of the photo-sensor 11, the light-sensitive surface of the photo-sensor must have a length L in the displacement direction 31 of the scale of at least $L=A+D$. As illustrated in FIG. 7, at certain positions two openings 10 will be located simultaneously over the light-sensitive surface 36 of the photo-sensor. Since such a photo-sensor is unable to distinguish these points, the result obtained would be difficult to interpret if light was transmitted through both of said openings simultaneously.

Figure 9:
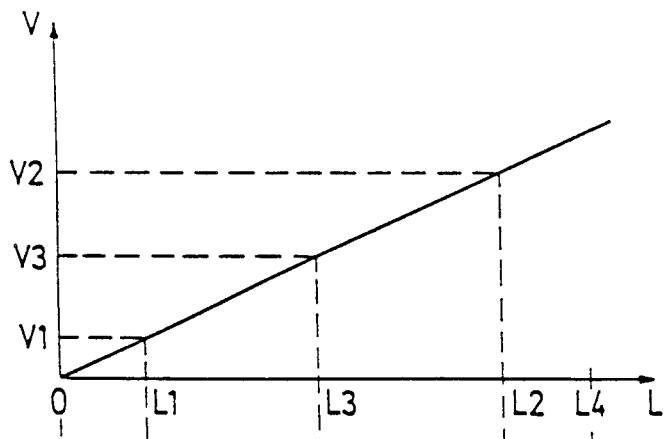
FIG. 8 and 9 illustrate signal processing in accordance with the second embodiment.
Figure 8:
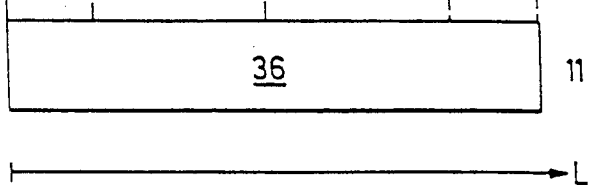

Consequently, according to one preferred embodiment two light-emitting devices 32, 33, which are preferably light-emitting diodes, are placed at a mutual distance apart B which slightly exceeds the distance A between two mutually adjacent light-permeable openings 10. A sensing circuit 34 is arranged to first ignite the one light-emitting device 32 and then the second device 33, and therewith sense the output voltage from the photo-sensor 11 deriving from illumination of the sensor by means of each of the light-emitting devices. The sensing circuit 34 is also constructed to accept solely that output voltage of the aforesaid two output voltages which lies within a predetermined voltage range corresponding to a given length interval of the photo-sensor. This is illustrated in FIGS. 8 and 9, where FIG. 8 illustrates the light-sensitive surface of the photo-sensor from above and FIG. 9 is a schematic diagram which illustrates the output voltage from the photo-sensor as a function of the centre-of-mass of a light spot on the light-sensitive surface.

The light-emitting devices 32, 33 are stationarily positioned relative to the photo-sensor and symmetrically located relative to the longitudinal extension of the photo-sensor in the direction L.

The surface 36 of the photo-sensor can be imagined to be divided into three regions, namely a working region L1 to L2, and a region O to L1, and L2 to L4 on a respective side of the working region. The length of the photo-sensor, the distance B and also the position L1 and L2 are so selected that when two openings 10 are located above the photo-sensor, one of said openings will be located above one of the regions O to L1 to L2 to L4. The analogue output voltage from the photo-sensor 11 is converted to digital form in an A/D-converter 35. The boundaries or junctures between the regions thus comprise the values V1, V2 of the output voltage from the photo-sensor. In the aforementioned case, only the value which lies within the working region is accepted, i.e. a voltage between V1 and V2. The sensing sequence is thus effected so that there is first ignited one light-emitting device 32, wherewith the value of the resultant output voltage is A/D-converted. The value is transmitted, via the sensing circuit 34, to the microprocessor, where it is stored in a memory. The device 32 is then extinguished, whereafter the second device 33 is ignited. The resultant output voltage is then A/D-converted and compared with the output voltage stored in the memory. The microprocessor 20 therewith selects the value which lies within the working region V1 to V2, which value is considered to be a measurement value which denotes the position of the scale 2 relative to the measuring head within one of the aforesaid intervals.

In that case when an opening 10 is located in the centre part of the working range, the output voltages from both of said light-emitting devices 32, 33 will lie between the voltages V1 and V2. In order to prevent acceptance of output voltages which derive from the boundary zones of the illuminated areas, the microprocessor 20 is constructed to select the output voltage which derives from the light spot generated by the device 32 in that case when the voltage is greater than V1 but is smaller than or equal to V3, and to select the output voltage which derives from the device 33 in that case when the voltage is greater than V3 but smaller than V2.

The sensitivity of the fine-measurement sensor is, of course, contingent on the distances A, B and the diameter D. The distance A may, for instance, be of the order of 2.4 mm and the distance B may be about 0.5 mm greater than the distance A. The diameter D may, for instance, be 0.5 mm. When using such measurements and commercially available photo-sensors there is obtained an accuracy of e.g., 0.5 micrometers.

According to the aforesaid second embodiment the sensing circuit 22 with associated electrodes 23–28 illustrated in FIG. 4 is replaced with the sensing circuit 34, the light-emitting devices 30, the A/D-converter 35 and the photo-sensor 11, as illustrated by the broken line 37 in FIG. 4.

In addition to affording the aforesaid advantages, this second embodiment of the invention also affords the advantage that the fine-measurement sensor is totally insensitive to electrical disturbances and that the scale can be made still narrower.

The capacitive measuring method described in Swedish Patent Specification 411 392 will not be described in more detail here and instead reference is made to said Swedish Patent Specification or alternatively to its American counterpart U.S. Pat. No. 4,420,754.

With regard to the various sensing circuits it is obvious that these can be incorporated to a lesser or greater extent in the microprocessor 20. The construction of such circuits does not form part of the present invention and are hence illustrated solely in the form of a schematic block diagram.

It will be clearly understood from the aforegoing that the present invention solves the problems recited in the introduction and that a number of advantages are obtained, of which the form-stability of the scale, its simple construction and its smaller dimensions are highly important.

Although the invention has been described in the aforegoing with reference to a number of exemplifying embodiments, it will be understood that modifications can be made thereto. For example, a capacitive measuring method other than that described can be used for the fine-measurement sensor. Furthermore, with regard to said second embodiment, slots can be used instead of circular holes.

These and similar modifications obvious to those skilled in this art are considered to be included by the present invention.

The present invention is thus not restricted to the aforedescribed embodiments and modifications can be made within the scope of the following claims.

We claim:

1. An absolute measuring scale system including a scale which extends a measuring length, and a measuring head which is movable relative to the scale, and which further includes a fine-measurement sensor which is operative in measuring the absolute values within each of a number of intervals located sequentially along the scale, and a coarse-measurement sensor operative in measuring the absolute values with regard to the interval in which the fine-measurement sensor is located at that moment, where the scale (2) includes a carrier (38) made of a transparent and form-stable material, which has provided on its surface a coating which forms an opaque pattern (3, 4; 3', 4'); which pattern forms along the length of the scale (2) transparent, mutually parallel binary code tracks (12) for use by said coarse measurement sensor and where the measuring head (1) incorporates light-emitting (5) and light-sensitive (6) devices by means of which the measuring head (1) is intended to sense the code track (12), the coarse-measurement sensor including the code-tracks (12) and said light emitting (5) and light sensitive (6) devices; and where said pattern (3, 4; 3', 4') along the length of the scale (2) also forms a plurality of sensing members which are intended to co-act with the fine-measurement sensor, said fine measurement sensing members including electrodes (18) which are formed by means of said surface coating and which, in coaction with electrodes (23–27, 28) provided in the measuring head (1), are included in a capacitive measuring system forming said fine measurement sensor.

2. The system as defined as in claim 1 wherein the electrodes (18) are mutually identical and are placed at mutually equal distances apart along the length of the scale (2).

3. The system as defined in claim 2 wherein at least one each of the light-emitting (5) and light-sensitive (6) devices are assigned to each code track (12); and in that there is provided a sensing circuit (21) which is intended to read the respective code tracks (12), by igniting the different light-emitting devices (5) sequentially, such that only one device is ignited at a time.

4. The system as defined in claim 3 wherein the coarse-measurement sensor with associated code tracks (12) is assigned a division which is a multiple of half the greatest significant measuring length assigned to the fine-measurement sensor.

5. The system as defined in claim 2 wherein the surface coating consists of chromium.

6. The system as defined in claim 1 wherein at least one each of the light-emitting (5) and light-sensitive (6) devices are assigned to each code track (12); and in that there is provided a sensing circuit (21) which is entended to read the respective code tracks (12), by igniting the different light-emitting devices (5) sequentially, such that only one device is ignited at a time.

7. The system as defined in claim 1 wherein the coarse-measurement sensor with associated code tracks (12) is assigned a division which is a multiple of half the greatest significant measuring length assigned to the fine-measurement sensor.

8. The system as defined in claim 7 wherein said patterned surface coating is formed by first applying a covering surface layer of uniform thickness and by subsequently removing parts of the surface layer by means of a photolithographic etching process.

9. The system as defined in claim 1 wherein said patterned surface coating is formed by first applying a covering surface layer of uniform thickness and by subsequently removing parts of the surface layer.

10. The system as defined in claim 8 wherein the surface coating consists of chromium.

11. The system as defined in claim 9 wherein portions of said covering layer are removed by means of a photolithographic etching process.

12. The system as defined in claim 1 wherein the surface coating consists of chromium.

13. The system as defined in claim 1 wherein said transparent material is glass.

14. The system as defined in claim 1 wherein said mutually parallel binary code tracks are formed in accordance with the so-called Grey-code.

15. An absolute measuring scale system including a scale which extends a measuring length, and a measuring head which is movable relative to the scale, and which further includes a fine-measurement sensor which is operative in measuring the absolute values within each of a number of intervals located sequentially along the scale, and a coarse-measurement sensor operative in measuring the absolute values with regard to the interval in which the fine-measurement sensor is located at that moment, where the scale (2) includes a carrier (38) made of a transparent and form-stable material which has provided on its surface a coating which forms an opaque pattern (3, 4; 3', 4') which pattern forms along the length of the scale (2) transparent, mutually parallel binary code tracks (12) for use by said coarse measurement sensor and where the measuring head (1) incorporates light-emitting (5) and light-sensitive (6) devices by means of which the measuring head (1) is intended to sense the code track (12), the coarse-measurement sensor including the code-tracks (12) and said light-emitting (5) and light sensitive (6) devices; and where said pattern (3, 4; 3', 4') along the length of the scale (2) also forms a plurality of sensing members which are intended to co-act with the fine-measurement sensor, said fine measurement sensor being an optical sensor including light-permeable openings (10) which are formed by means of the surface coating and which are placed along a line extending along the length of the scale (2); in that there is located on one side of the scale (2) a light-emitting device (30) which is intended to transmit light through said openings (10); and in that there is located on the other side of the scale (2) a light-sensitive device in the form of a position-sensitive photo-sensor (11) which has an extension in the longitudinal extension of the scale (2) which exceeds the distance (A) between two mutually adjacent openings and which is intended to produce a voltage which is proportional to the position of a light spot on the photo-sensor this light spot deriving from light transmitted by said light-emitting device (30) through one of the openings (10) said light-emitting device (30) further including two light-emitting devices (32, 33) which are located at a mutual distance apart (B) which slightly exceeds the distance (A) between two mutually adjacent light-permeable openings (10); and in that a sensing circuit (34) is intended to firstly ignite solely one light-emitting device (32) and then ignite solely the other device (33), and in that the sensing circuit (34) is intended therewith to sense the output voltage from the photo-sensor (11) deriving from illumination by means of each of the two light-emitting devices (32, 33); and in that the sensing circuit (34) is constructed to accept solely that output voltage of said two output voltages which lies within a pre-determined voltage range (V1 to V2) corresponding to a given length interval (L1 to L3) of the photo-sensor (11).

16. The system as defined in claim 15 wherein the coarse-measurement sensor with associated code tracks (12) is assigned a division which is a multiple of half the greatest significant measuring length assigned to the fine-measurement sensor.

* * * * *

UNITED STATES PATENT AND TRADEMARK OFFICE
CERTIFICATE OF CORRECTION

PATENT NO. : 5,062,214

DATED : November 5, 1991

INVENTOR(S) : Carl-Erik Gustafsson and Bo Pettersson

It is certified that error appears in the above-identified patent and that said Letters Patent is hereby corrected as shown below:

Column 2, last line, change the colon (:) to a semi-colon (;);

Column 4, line 33, delete the comma (,);

Column 7, line 7, delete "on";

Column 7, line 17, delete the comma (,);

Column 9, line 59, change "3" to --2--;

Column 10, line 19, change "8" to --9--.

Signed and Sealed this

Twentieth Day of April, 1993

*Attest:*

MICHAEL K. KIRK

*Attesting Officer*     Acting Commissioner of Patents and Trademarks